United States Patent
Takahashi et al.

(10) Patent No.: US 10,070,027 B2
(45) Date of Patent: *Sep. 4, 2018

(54) CAMERA APPARATUS

(71) Applicant: PANASONIC INTELLECTUAL PROPERTY MANAGEMENT CO., LTD., Osaka (JP)

(72) Inventors: Masami Takahashi, Kanagawa (JP); Shinichi Murata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 48 days.

This patent is subject to a terminal disclaimer.

(21) Appl. No.: 14/741,826

(22) Filed: Jun. 17, 2015

(65) Prior Publication Data

US 2015/0288862 A1 Oct. 8, 2015

Related U.S. Application Data (63) Continuation of application No. 13/552,995, filed on Jul. 19, 2012, now Pat. No. 9,113,094.

(30) Foreign Application Priority Data

Aug. 4, 2011 (JP) ................. 2011-170759

(51) Int. Cl.
H04N 5/33 (2006.01)
H04N 5/225 (2006.01)
(Continued)

(52) U.S. Cl.
CPC .......... *H04N 5/2254* (2013.01); *G03B 11/04* (2013.01); *G03B 11/043* (2013.01);
(Continued)

(58) Field of Classification Search
CPC .... H04N 5/2254; H04N 5/225; H04N 5/2256; H04N 5/33; G03B 11/04; G03B 11/043; G03B 11/045; G03B 15/05
(Continued)

(56) References Cited

U.S. PATENT DOCUMENTS

| | | | | |
|---|---|---|---|---|
| 5,326,276 A | * | 7/1994 | Cheng | H01R 12/7005 439/326 |
| 5,701,015 A | | 12/1997 | Lungershausen et al. | |

(Continued)

FOREIGN PATENT DOCUMENTS

| | | |
|---|---|---|
| JP | 11-085386 | 3/1999 |
| JP | 2001-124970 | 5/2001 |

(Continued)

*Primary Examiner* — Michael Lee
(74) *Attorney, Agent, or Firm* — Greenblum & Bernstein, P.L.C.

(57) ABSTRACT

A camera apparatus comprising an image pickup device, a lens cover which has an end plate comprising a first plate with a through hole and a second plate positioned in the through hole, and a lens which is covered by the lens cover and converges light from an object to the image pickup device, the light passing through the end plate. A plurality of light sources are arranged to surround the lens in the lens cover and a light shielding member is arranged between the lens and the light sources, and bridges a gap between the first plate and the second plate.

19 Claims, 9 Drawing Sheets

(51) Int. Cl.
  *G03B 11/04*  (2006.01)
  *G03B 15/05*  (2006.01)
  *H04N 7/18*   (2006.01)

(52) U.S. Cl.
  CPC ............ *G03B 11/045* (2013.01); *G03B 15/05* (2013.01); *H04N 5/225* (2013.01); *H04N 5/2256* (2013.01); *H04N 5/33* (2013.01); *H04N 7/18* (2013.01); *G03B 2215/0503* (2013.01); *G03B 2215/0567* (2013.01); *G03B 2215/0575* (2013.01); *G03B 2215/0589* (2013.01)

(58) Field of Classification Search
  USPC .......................................................... 348/143
  See application file for complete search history.

(56) References Cited

U.S. PATENT DOCUMENTS

| | | | |
|---|---|---|---|
| 7,161,749 B2 | 1/2007 | Sakurai et al. | |
| 9,113,094 B2 * | 8/2015 | Takahashi | H04N 5/33 348/143 |
| 2004/0095465 A1 | 5/2004 | Numazaki et al. | |
| 2005/0146641 A1 * | 7/2005 | Cheng | H04N 5/2256 348/373 |
| 2006/0146175 A1 | 7/2006 | Numazaki et al. | |
| 2007/0206114 A1 | 9/2007 | Tanaka et al. | |
| 2008/0122927 A1 * | 5/2008 | Konno | G08B 13/19626 348/143 |
| 2008/0285968 A1 * | 11/2008 | Chang | G03B 17/02 396/542 |
| 2010/0079591 A1 * | 4/2010 | Lee | G08B 13/19626 348/143 |
| 2010/0253832 A1 | 10/2010 | Duparre | |
| 2011/0187856 A1 | 8/2011 | Lai | |
| 2012/0092549 A1 * | 4/2012 | Hsu | G03B 15/03 348/374 |
| 2012/0170119 A1 * | 7/2012 | Chu | G03B 11/00 359/512 |

FOREIGN PATENT DOCUMENTS

| | | | |
|---|---|---|---|
| JP | 3988051 | 7/2007 | |
| JP | 2007-235863 | 9/2007 | |
| JP | 2011-170759 | 8/2011 | |
| WO | WO2011050497 A1 * | 5/2011 | G03B 15/03 |

* cited by examiner

CAMERA APPARATUS

CROSS-REFERENCE RELATED APPLICATIONS

The present application is a continuation of U.S. application Ser. No. 13/552,995 filed Jul. 19, 2012, the disclosure of which is incorporated herein by reference in its entirety.

BACKGROUND

1. Technical Field

The present invention relates to a camera apparatus including a light shielding member provided at a lens cover.

2. Background Art

Some of surveillance cameras use infrared light having permeability or spectral characteristics superior to visible light. In the type of the surveillance camera, in order to prevent the infrared light of an infrared light source arranged around a lens from being incident on an optical system directly, a light shielding member is provided at a lens cover. JP-B-3988051 discloses an imaging apparatus, which is an example of a technique to provide a light shielding plate on a lens hood.

Figure 9A:
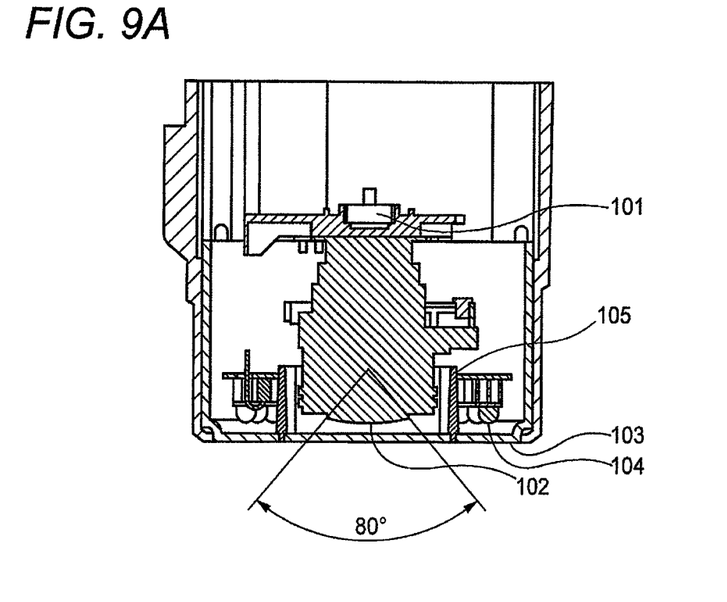
FIG. 9A is a cross-sectional view of a lens cover portion of the related art including an optical axis thereof.
Figure 9B:
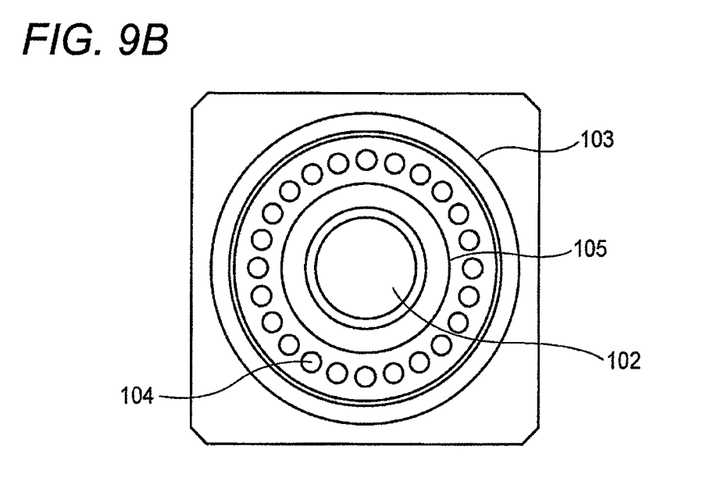
FIG. 9B is a front view thereof.

FIGS. 9A and 9B shows the surveillance camera of the related art which shields infrared light with a light shielding member. The surveillance camera includes an image pickup device 101, a lens 102 which converges light from an object to the image pickup device 101, and a circular coaxial lens cover 103 which has the lens 102 inside thereof. In the lens cover 103, a plurality of infrared light sources 104 are annularly arranged to surround the lens 102. A planar or cylindrical light shielding member 105 having a circular opening shape is provided between the lens 102 and the infrared light source 104. Since the light shielding member 105 is provided, the infrared light can be suppressed to incident on the lens 102 without passing through the object from the infrared light source 104.

SUMMARY

However, when the light shielding member 105 is circular shape, a vignetting occurs in a diagonal direction of an angle of view. In a case of the light shielding member 105 having a circular shape, a horizontal angle of view is limited to about 80 degree to obtain an image without the vignetting. Accordingly, in a case where the light shielding member 105 is the circular shape, in order to obtain wider angle of view of the lens, it is necessary to increase the diameter of the light shielding member 105. As a result, the whole of the light shielding member 105 becomes large in the diameter, and the cross section of a product becomes large.

The present invention was made in view of the above-described circumstances, and an object thereof is to provide a camera apparatus capable of obtaining the wide angle image without increasing the size of the apparatus.

An aspect of the invention provides a camera apparatus including: an image pickup device; a lens configured to converge light from an object to the image pickup device; a coaxial circular-shaped lens cover in which the lens is arranged; a plurality of infrared light sources arranged to surround the lens in the lens cover; and a light shielding member which is provided between the lens and the infrared light source and which has an opening, wherein the opening is outwardly extended at corner optical path portions which correspond to diagonal corners of an angle of view of the image pickup device.

According to the camera apparatus of the aspect, the product can be decreased in size while obtaining the wide angle image without vignetting.

DETAILED DESCRIPTION

Hereinafter, embodiments of the invention are described with reference to drawings.

Figure 1:
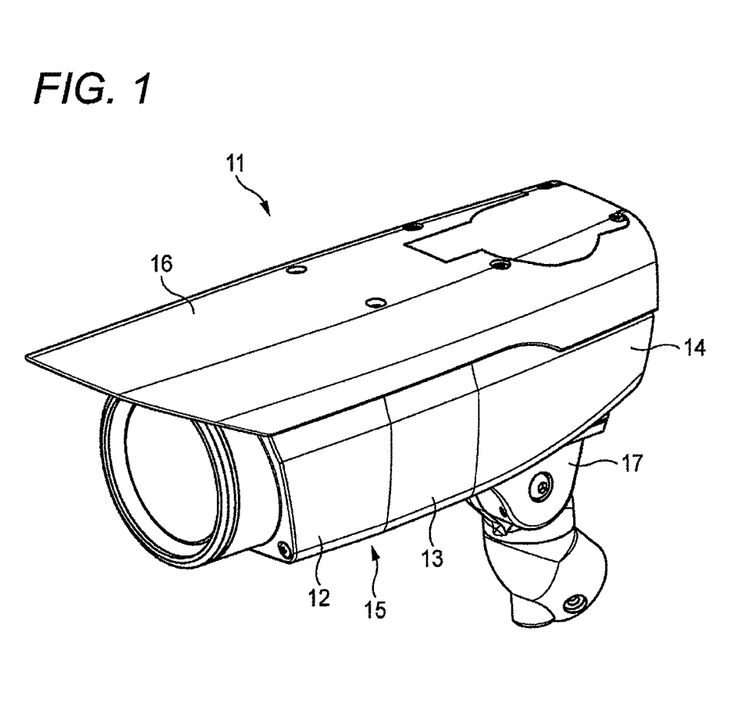
FIG. 1 is a perspective view of a surveillance camera of an embodiment according to the invention.

FIG. 1 is a perspective view of a surveillance camera which serves as a camera apparatus of an embodiment according to the invention.

A surveillance camera 11 of the embodiment is covered by a cover case 15 including a front cover 12, a main body cover 13 and a rear cover 14. The cover case 15 is further covered by a top plate 16 at an upper portion thereof. In the surveillance camera 11, a mounting seat 17 is provided at the location of the main body cover 13, and the mounting seat 17 is fixed at a support which meets a CD including a female LAN terminal (not shown).

Figure 2:
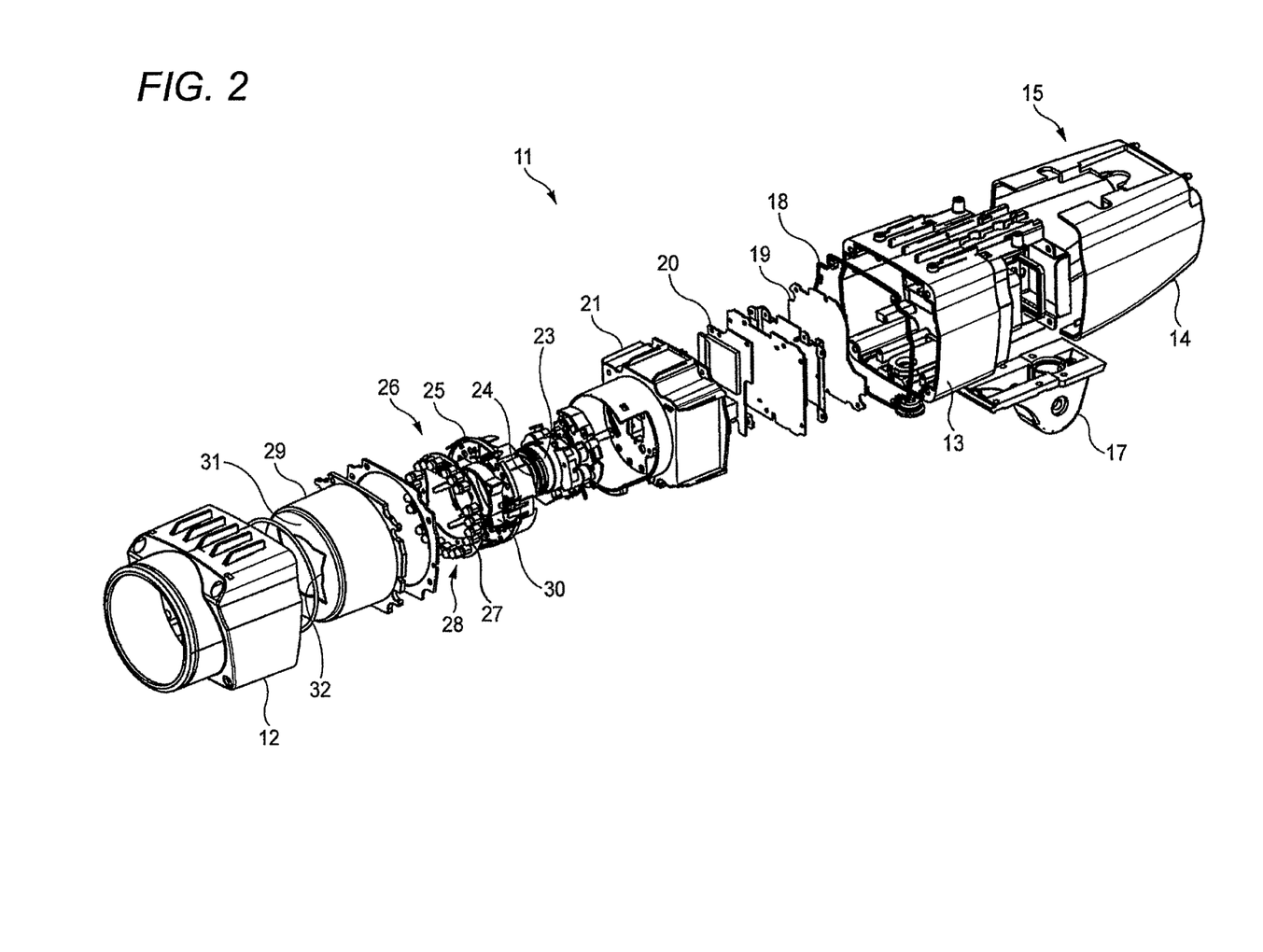
FIG. 2 is an exploded perspective view of the surveillance camera illustrated in FIG. 1.

FIG. 2 is an exploded perspective view of the surveillance camera 11 illustrated in FIG. 1.

In the main body cover 13, a seal frame material 18, a heat sink 19, a rear surface pressing plate 20 and an operation portion cover 21 are accommodated. In the operation portion cover 21, an image pickup device 22 is accommodated. In the image pickup device 22, a cylindrical lens seat 23 is provided, and the lens seat 23 accommodates therein a lens 24. The lens 24 converges light from the object to the image pickup device 22.

At an outer periphery of the lens seat 23, an annular light source mounting board 25 is inserted from outside. At the light source mounting board 25, an annular infrared light source 26 is mounted. In the embodiment, the infrared light source 26 includes an annular LED light emitting portion 28 in which a plurality of LEDs 27 are arranged in a circumferential direction. As the infrared light source 26, a light source other than the LED may be used.

The outside of the annular LED light emitting portion 28 is covered by a lens cover 29. The lens cover 29 is accommodated in the front cover 12. The lens cover 29 is formed in a coaxial circular shape and includes therein the annular LED light emitting portion 28 and the lens 24. In other words, the infrared light source 26 surrounds the lens 24 at the inside of the lens cover 29 and is annularly arranged. A light shielding member 30 is provided between the lens 24 and the annular LED light emitting portion 28.

Figure 3A:
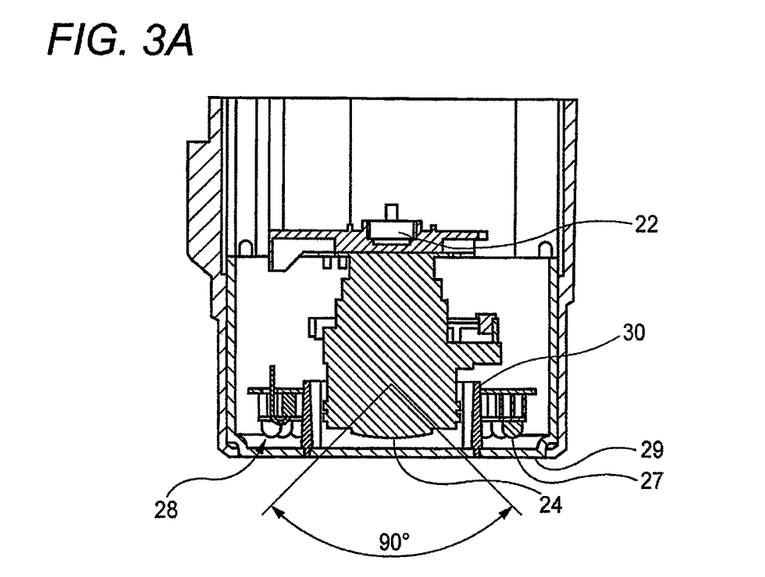
FIG. 3A is a cross-sectional view of a lens cover portion including an optical axis thereof illustrated in FIG. 2.
Figure 3B:
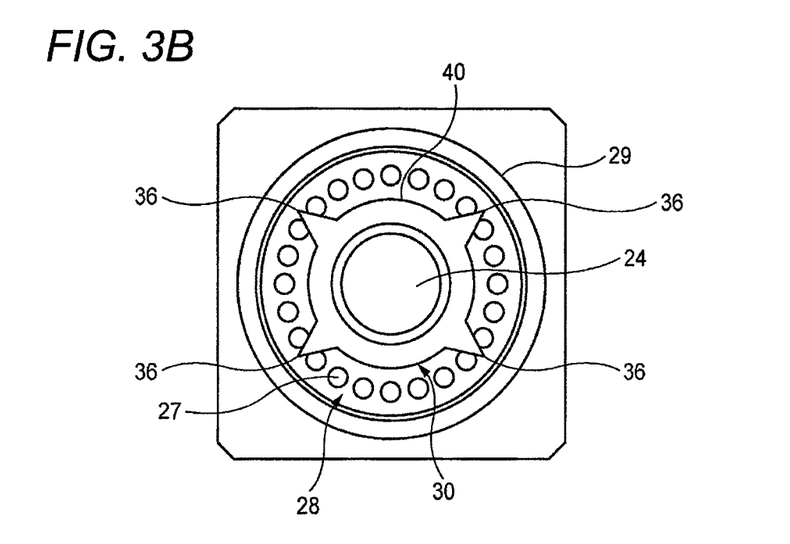
FIG. 3B is a front view thereof.
Figure 4A:
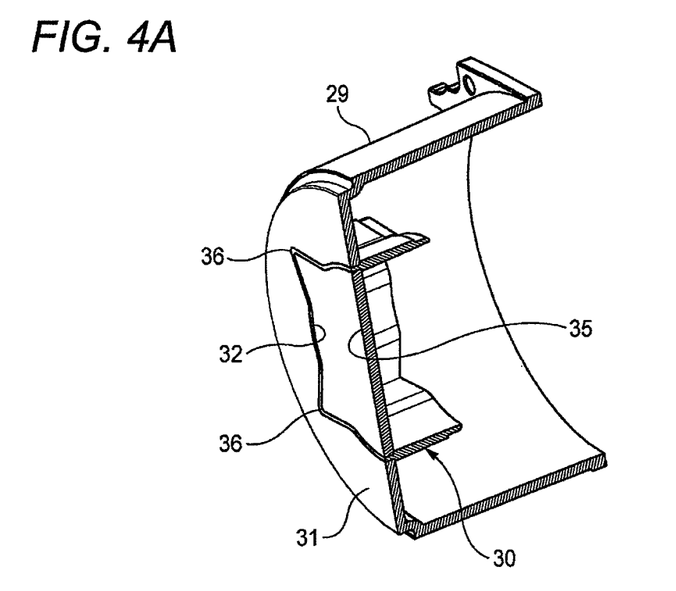
FIG. 4A is a perspective view of the lens cover with cutaway a portion thereof.
Figure 4B:
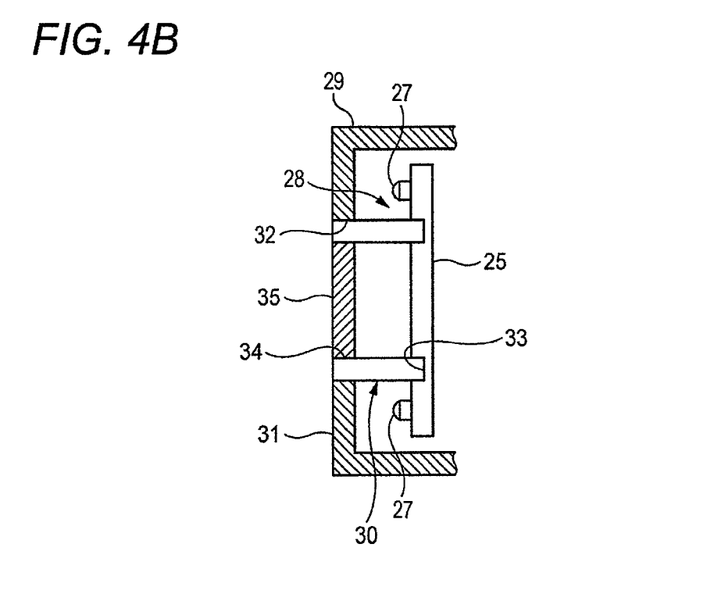
FIG. 4B is a front view of a cutaway surface thereof.

FIG. 3A is a cross-sectional view of a lens cover portion illustrated in FIG. 2 including an optical axis thereof, FIG. 3B is a front view thereof, FIG. 4A is a perspective view of the lens cover 29 with cutaway a portion thereof and FIG. 4B is a front view of a cutaway surface thereof.

As shown in FIG. 4A, the light shielding member 30 is coaxially mounted to a circular end plate 31 which closes one axial end of the lens cover 29. The circular end plate 31 of the lens cover 29 is formed by a member which transmits at least the infrared light. As shown in FIG. 4B, at the circular end plate 31, a light shielding member mounting hole 32, in which the light shielding member 30 penetrates and is assembled, is formed. The light shielding member 30 is inserted into the light shielding member mounting hole 32. A rear end of the light shielding member 30, which is mounted in the light shielding member mounting hole 32, is fitted and fixed in a concave portion 33 of the light source mounting board 25. In other words, a front end of the light shielding member 30 is fixed in the light shielding member mounting hole 32, and the rear end thereof is fixed to the light source mounting board 25. The lens 24 fixed at the lens seat 23 is arranged an inside of the light shielding member 30. In addition, a front opening portion 34 of the light shielding member 30 is covered by a cover member 35 which transmits at least the infrared light. The cover member 35 is separated from the circular end plate 31.

Figure 5A:
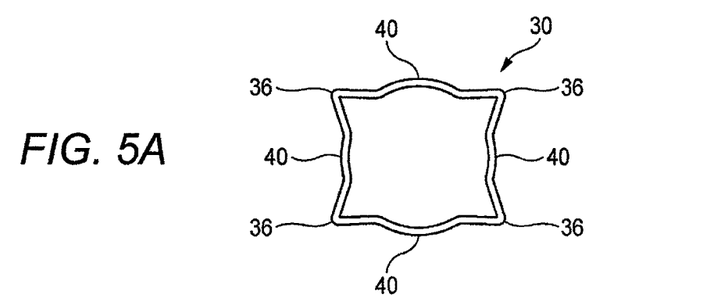
FIG. 5A is a front view of a light shielding member having an opening shape in a triangular bulging-shaped portion.
Figure 5B:
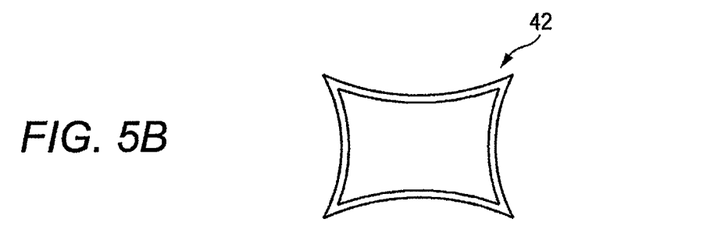
FIG. 5B is a front view of a light shielding member having an opening shape similar to a light flux corresponding to an angle of view.
Figure 5C:
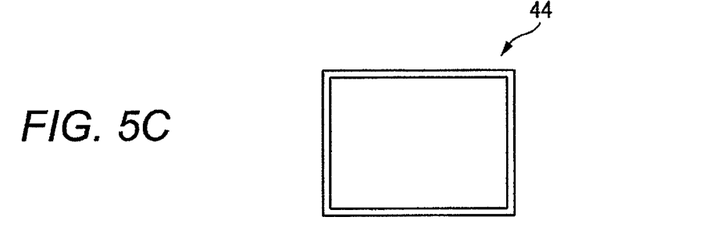
FIG. 5C is a front view of a light shielding member having an opening shape of a rectangular shape.
Figure 5D:
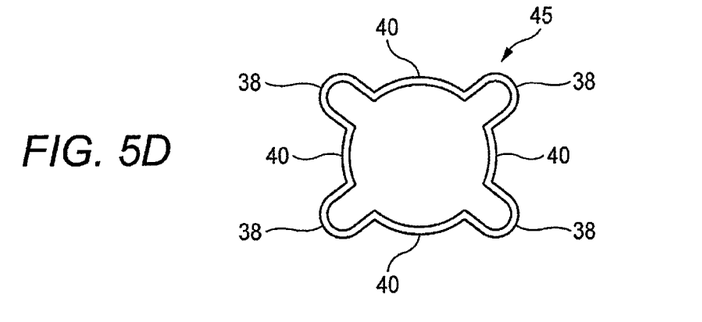
FIG. 5D is a front view of a light shielding member having an opening shape in a half oval-shaped portion.

FIG. 5A is a front view of a light shielding member 30 having an opening shape in a triangular bulging-shaped portion 36, FIG. 5B is a front view of a light shielding member 42 having an opening shape similar to a light flux 37 (see FIG. 6A, FIG. 6B and FIG. 6C) corresponding to an angle of view, FIG. 5C is a front view of a light shielding member 44 having an opening shape of a rectangular shape and FIG. 5D is a front view of a light shielding member 45 having an opening shape in a half oval-shaped portion 38.

The light shielding member 30 has an opening shape which outwardly extends at a diagonal corner corresponding optical path portion 39 (hereinafter referred to as a corner optical path portion 39) corresponding to the diagonal corners of the angle of view in the image pickup device 22. In the embodiment, as shown in FIG. 5A, the light shielding member 30 is configured such that the opening shape thereof has the triangular bulging-shaped portion 36 which outwardly protrudes from a circular opening shape portion 40 at a position corresponding to the corner optical path portion 39. Accordingly, in the embodiment, while the circular opening shape portion 40 of the light shielding member 30 is not changed from a shape of the related art, only the triangular bulging-shaped portion 36 protruding from the circular opening shape portion 40 is formed to avoid the corner optical path portion 39 which protrudes outwardly.

With this configuration, it is not necessary to largely change the location of the infrared light source 26 from the related art.

Next, the function of the surveillance camera 11 having the configuration described above is described while comparing with a comparative example.

Figure 6A:
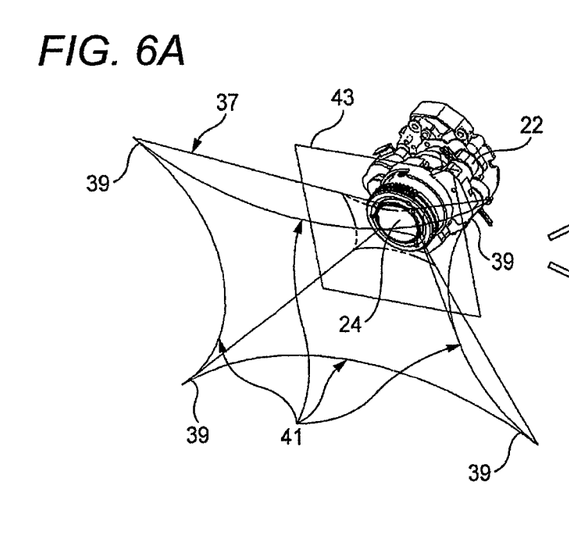
FIG. 6A is a perspective view in the vicinity of a lens representing an optical path corresponding to the angle of view.
Figures 6B, 6C:
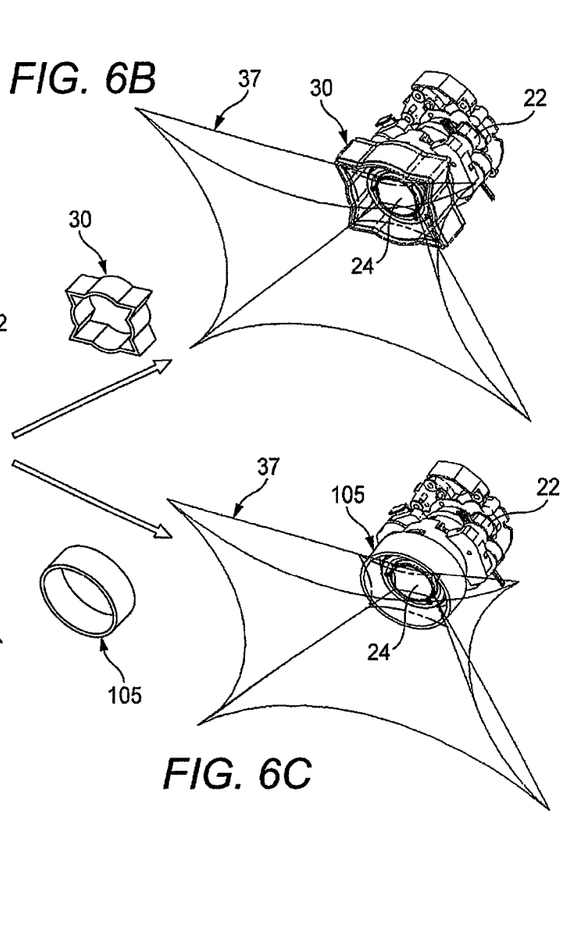
FIG. 6B is a perspective view in the vicinity of a lens including a light shielding member of an embodiment.
FIG. 6C is a perspective view in the vicinity of a lens including a light shielding member of a comparative example.
Figure 7A:
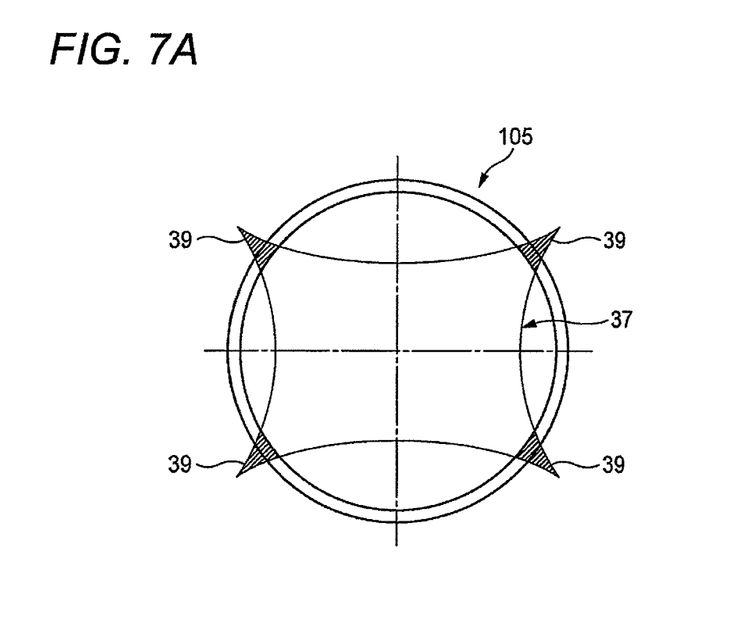
FIG. 7A is a front view of FIG. 6C.
Figure 7B:
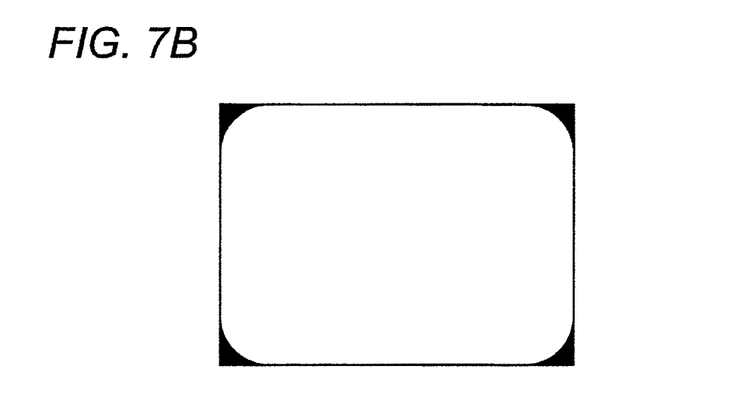
FIG. 7B is a front view of an image obtained by the light shielding member.
Figure 8A:
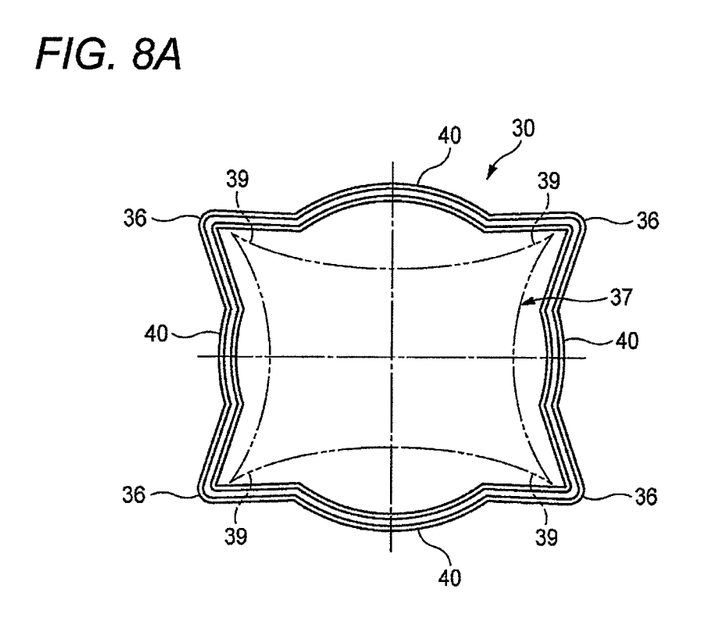
FIG. 8A is a front view of FIG. 6B.
Figure 8B:
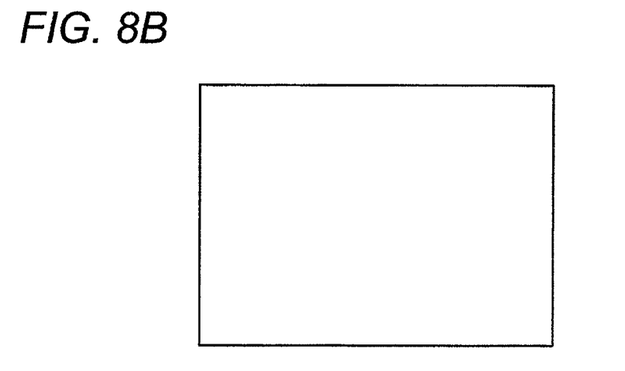
FIG. 8B is a front view of an image obtained by the light shielding member.

FIG. 6A is a perspective view in the vicinity of a lens representing an optical path corresponding to the angle of view, FIG. 6B is a perspective view in the vicinity of a lens including a light shielding member 30 of an embodiment, FIG. 6C is a perspective view in the vicinity of a lens including a light shielding member 105 of a comparative example, FIG. 7A is a front view of FIG. 6C, FIG. 7B is a front view of an image obtained by the light shielding member, FIG. 8A is a front view of FIG. 6B, FIG. 8B is a front view of an image obtained by the light shielding member.

As shown in FIG. 6A, in a case where the light passing through the lens 24 produces an image of a rectangular shape, for example, on a CCD (or a CMOS) of the image pickup device 22, the light flux 37 before entering into the lens 24 has a cross-sectional shape surrounded by light flux lines 41 such that the corner optical path portion 39 tends to protrude (the corner extends radially). Specifically, in a case of a lens 24 of a wide-angle lens system, the light hits obliquely on a peripheral portion of the CCD. When the light obliquely enters the CCD, electric charge cannot be generated sufficiently. The diagonal corner portion has a tendency to protrude in order to compensate for this of the light amount.

Here, for example, as shown in FIG. 6C, when using the light shielding member 105 of the circular shape according to the comparative example similar to the related art, as shown in FIG. 7A, the corner optical path portion 39 protruding outward is positioned the outside of the light shielding member 105 and is vignetted. As a result, as shown in FIG. 7B, the image becomes dark at the diagonal corner portion.

In contrast, in the configuration using the light shielding member 30 according to the embodiment shown in FIG. 6B, as shown in FIG. 8A, the triangular bulging-shaped portion 36 outwardly protruding from the circular opening shape portion 40 is provided at a position corresponding to the corner optical path portion 39. Accordingly, the optical path for the diagonal corner is secured, which is necessary at the time of wide angle of the lens. The lens optical path and an image pickup range generally tend to protrude in the diagonal corner portion. With this configuration, as shown in FIG. 8B, the image with no vignetting can be obtained without increasing the diameter of the light shielding member 30 as a whole, by outwardly extending only the optical path portion 39 in the light shielding member 30.

Next, a modification of the light shielding member 30 is described.

As shown in FIG. 5B, the opening of the light shielding member 42 may have a shape similar to a cross sectional shape of the light flux 37 on a plane 43 (see FIG. 6A) orthogonal to a center axis of the light flux 37 which corresponds to the angle of view in the image pickup device 22 and which enters from the object into the lens 24.

According to the light shielding member 42 of the modification, the shape thereof is somewhat complicated. However, the light shielding member 42 can be formed in a minimum size without occurrence of the vignetting.

As shown in FIG. 5C, the opening of the light shielding member 44 may be a rectangular shape which is defined by straight lines which connect the protruding ends of the adjacent corner optical path portions 39.

According to the light shielding member 44 of the modification, the light shielding member 44 can be produced in the rectangular shape which is easily manufactured without the vignetting. Even in the case, the light shielding member 44 can be formed smaller than the case where the light shielding member 105 of the circular shape of the related art as a whole is increased in the diameter, since when the diameter of the light shielding member 105 is increased, the diameter of the opening becomes a diameter of a circumscribing circle of the rectangular shape of the light shielding member 44.

As shown in FIG. 5D, the opening of the light shielding member 45 may have the half oval-shaped portion 38 which outwardly bulges from the circular opening shape portion 40 at the position corresponding to the optical path portion 39.

According to the light shielding member 45 of the modification, while the circular opening shape portion 40 of the light shielding member 30 is not changed from a shape of the related art, the half oval-shaped portion 38 protrudes radially from the circular opening shape portion 40. Accordingly, it is not necessary to largely change the location of the infrared light source 26 from the related art. In addition, according to the configuration, the manufacture becomes easy. Furthermore, by changing the protrusion length of the half oval-shaped portion 38, the light shielding member can easily deal with the optical path portion 39 where the degree of the protrusion increases and decreases according to the degree of the wide angle.

According to the surveillance camera 11 of the embodiment, the product can be decreased in size while obtaining the wide angle image without vignetting.

The embodiment may be applied to the camera apparatus corresponding to the wide angle image without enlarging the cross section of the product.

This application claims the benefit of Japanese Patent Application No. 2011-170759 filed on Aug. 4, 2011, the contents of which are incorporated herein by reference.

The invention claimed is:

1. A camera apparatus comprising:
an image pickup device;
a lens cover which has an end plate comprising
a first plate with a through hole,
a second plate positioned in the through hole, and
a wall portion that extends out, from an outer end of the first plate, in a
substantially perpendicular direction,
the first plate and the wall portion being a single integrated structure;
a lens which is covered by the lens cover and converges light from an object to the image pickup device, the light passing through the end plate, the first plate and the second plate of the end plate positioned in front of a frontmost surface of the lens;
a plurality of light sources arranged to surround the lens in the lens cover; and
a light shielding member which is positioned between the lens and the light sources, and that extends towards the image pickup device,
wherein a portion of the light shielding member directly contacts portions of the first plate and the second plate to bridge a gap between the first plate and the second plate,
wherein the lens is circumferentially surrounded by the light shielding member,
wherein the plurality light sources is positioned within between two ends of light shielding member, and
wherein the wall portion of the lens cover and the light shielding member are substantially parallel to one another.

2. The camera apparatus according to claim 1, wherein the gap circularly extends along the second plate.

3. The camera apparatus according to claim 1, wherein a thickness of the light shielding member varies.

4. The camera apparatus according to claim 1, wherein a thickness of one end of the light shielding member is smaller than a thickness of another end of the light shielding member that is positioned inside of the lens cover.

5. The camera apparatus according to claim 1, wherein a thickness of both ends of the light shielding member is smaller than a thickness of a middle portion of the light shielding member positioned between the both ends of the light shielding member.

6. The camera apparatus according to claim 1, wherein an end of the light shielding member is positioned between the first plate and second plate.

7. The camera apparatus according to claim 1, wherein the light shielding member is structured to extend perpendicular to the end plate and the light shielding member does not pass through a flat plane defined by the first plate or the second plate.

8. The camera apparatus according to claim 1, further comprising:
a board, the plurality of the light sources and an end of the light shielding member mounted to the board.

9. The camera apparatus according to claim 8, wherein the board comprising a circular concave portion and the end of the light shielding member is fixed in the circular concave portion.

10. The camera apparatus according to claim 9, wherein the light shielding member is structured to extend perpendicular to the end plate and the circular concave portion has a shape corresponding to the gap between the first plate and the second plate.

11. The camera apparatus according to claim 1, wherein an outer frame of the first plate comprises a first arcuate portion and an outer frame of the second plate comprises a second arcuate portion substantially coaxial with the first arcuate portion.

12. The camera apparatus according to claim 1, wherein the light shielding member is shorter than the lens cover in a direction perpendicular to the end plate.

13. The camera apparatus according to claim 1, wherein the light sources output infrared light.

14. The camera apparatus according to claim 1, wherein a center of a circle defined by the plurality of the light sources corresponds to a center of an outer ring of the second plate.

15. The camera apparatus according to claim 1, wherein the lens cover is coaxially positioned about the lens.

16. The camera apparatus according to claim 1, wherein an inner frame of the first plate extends outwardly at corner optical path portions which corresponds to diagonal corners of an angle of view of the image pickup device, the inner frame having a periphery comprising a plurality of first arcuate portions and a plurality of second portions having a shape different that a shape of the first arcuate portions, each of the second portions being provided between two of the first arcuate portions, the second portions corresponding to the corner optical path portions and including at least one non-arcuate portion.

17. A camera apparatus comprising:
an image pickup device;
a lens cover which has an end plate, and a wall portion that extends out, from an outer end of the end plate, in a substantially perpendicular direction, the end plate and the wall portion being a single integrated structure;
a lens which is covered by the lens cover and converges light from an object to the image pickup device, the light passing through the end plate;
a plurality of light sources arranged to surround the lens in the lens cover; and
a light shielding member which is arranged between the lens and the light sources, and extends through a hole in the end plate,
wherein the light shielding member is shorter than the wall portion of the lens cover in a direction perpendicular to the end plate,
wherein the wall portion of the lens cover and the light shielding member are substantially parallel to one another, and
a thickness of both ends of the light shielding member is smaller than a thickness of a middle portion of the light shielding member positioned between the both ends of the light shielding member.

18. A camera apparatus comprising:
an image pickup device;
a lens cover which has an end plate;
a lens which is covered by the lens cover and converges light from an object to the image pickup device, the light passing through the end plate;
a plurality of light sources arranged to surround the lens and positioned within the lens cover; and
a light shielding member which is arranged between the lens and the light sources, defines an opening, and extends towards the image pickup device;
wherein the lens cover further comprises
a first plate which connects an outer frame of the light shielding member,
a second plate which blocks the opening the first plate, and
a wall portion that extends out, from an outer end of the first plate, in a substantially perpendicular direction,
wherein the second plate and an end of the light shielding member define a flat surface plane, and
wherein the wall portion of the lens cover and the light shielding member are substantially parallel to one another.

19. The camera apparatus according to claim 1, wherein a surface of the light shielding member extending in a direction transverse to an optical axis of the lens contacts surfaces of the first and second plates of the end plate that face the frontmost surface of the lens.

* * * * *